(12) United States Patent
Washington (10) Patent No.: US 7,213,953 B2
(45) Date of Patent: May 8, 2007

(54) DURABLY AFFIXABLE LIGHT DEVICES FOR ROTATING WHEELS

(76) Inventor: Steven J. Washington, 626 Strihal Loop, Oakland, FL (US) 34787

( * ) Notice: Subject to any disclaimer, the term of this patent is extended or adjusted under 35 U.S.C. 154(b) by 45 days.

(21) Appl. No.: 11/101,941

(22) Filed: Apr. 8, 2005

(65) Prior Publication Data

US 2006/0227564 A1   Oct. 12, 2006

(51) Int. Cl.
*B60Q 1/32* (2006.01)
*B60Q 1/24* (2006.01)
(52) U.S. Cl. ...................................... 362/500
(58) Field of Classification Search ................. 362/500
See application file for complete search history.

(56) References Cited

U.S. PATENT DOCUMENTS

| | | | |
|---|---|---|---|
| 3,610,911 A * | 10/1971 | Curl | 362/621 |
| 4,763,230 A | 8/1988 | Cummings et al. | |
| D332,441 S | 1/1993 | Douglas, Jr. | |
| 5,353,210 A * | 10/1994 | Strok et al. | 362/293 |
| 5,530,630 A | 6/1996 | Williams, Jr. | |
| 5,558,426 A | 9/1996 | Cabanatan et al. | |
| 5,876,108 A | 3/1999 | Chien | |
| 6,059,431 A * | 5/2000 | Ellis, Jr. | 362/500 |
| 6,116,762 A * | 9/2000 | Kutlucinar | 362/500 |
| 6,176,603 B1 | 1/2001 | Spicer | |
| 6,220,733 B1 | 4/2001 | Gordon | |
| 6,386,731 B1 | 5/2002 | Cheng | |
| 6,467,939 B2 | 10/2002 | Deutsch et al. | |
| 6,565,243 B1 * | 5/2003 | Cheung | 362/500 |
| 6,572,251 B1 | 6/2003 | Huang | |
| 6,612,726 B1 * | 9/2003 | Gloodt et al. | 362/500 |
| 6,742,913 B2 | 6/2004 | Deutsch | |
| 6,776,458 B1 | 8/2004 | Wang | |
| 2003/0142506 A1 | 7/2003 | Deutsch | |
| 2003/0151924 A1 | 8/2003 | Gloodt et al. | |
| 2004/0042227 A1 | 3/2004 | Gloodt et al. | |

* cited by examiner

*Primary Examiner*—Sandra O'Shea
*Assistant Examiner*—James W Cranson, Jr
(74) *Attorney, Agent, or Firm*—Joseph Fischer; Beusse Wolter Sanks Mora & Maire, P.A.

(57) ABSTRACT

An illumination device adapted for attachment to a surface of a rotatable wheel comprises a rigid body having a substantially flat surface to which is attached an adhesive material effective to adhere the illumination device to a desired position on the wheel surface. The illumination device also comprises a light source, a power source, such as one or more batteries, and an electrical circuit that includes a switch for closing the circuit to result in production of light by the light source. The switch may be a motion-activated switch, a simple on-off switch, or other suitable types. In embodiments disclosed, a cavity in the rigid body holds the batteries, and a lamp cover houses the light source (and selected elements of the electrical circuit).

The invention also is directed to forming a lighting pattern on a wheel by positioning such illumination devices on selected positions on the wheel, and activating them to create a desired lighting pattern.

20 Claims, 7 Drawing Sheets

DURABLY AFFIXABLE LIGHT DEVICES FOR ROTATING WHEELS

BACKGROUND OF THE INVENTION

The lighting of the rotating wheels of automobiles and other moving vehicles utilizes a range of devices and strategies, to achieve various types of illumination of those wheels for safety and/or for decorative purposes.

For example, U.S. Pat. No. 5,558,426, issued Sep. 24, 1996 to Dennis and Henry Cabanatan, discloses a set of automobile wheel lights that cast light to the wheels and are mounted on the automobile frame near each respective wheel. U.S. Pat. No. 6,176,603, issued Jan. 23, 2001 to Lester Spicer, discloses a wheeling light system that is mounted behind a wheel and casts light through openings in and/or around the wheel. U.S. Pat. No. 6,612,726, issued Sep. 2, 2003 to Cary Gloodt and James Hutchison, also discloses lighting an automobile system from behind the wheel, in which the wheel covering is at least partly transparent. In the disclosures of these three patents, the power source is located in the automobile body, and not in the rotating wheel.

Other attempts to light rotating wheels provide the lighting devices on the wheel. For example, U.S. Pat. No. 4,763,230, issued Aug. 9, 1988 to Cummings and Rose, disclose a string of lights, and a source of electrical power, connected to each other and attached to spokes of a bicycle wheel. U.S. Pat. No. 6,220,733, issued Apr. 24, 2001 to Gordon, provides a vehicle wheel in which at least one light source and at least one reflective body are arranged. In one disclosed embodiment, a number of light-emitting diodes (LEDs) are mounted proximate to the center of a wheel, and are powered by batteries mounted in the inner hub of the wheel. Reflective bodies aligned to receive light from the LEDs are arranged variously, including by replacing spokes of a wheel with suitably sized and shaped reflective bodies. U.S. Pat. No. 5,530,630, issued Jun. 25, 1996 to Williams, describes a complex assembly for attaching to a wheel, so that lights rotate with the wheel, and are powered, via a commutator, from a power source in the vehicle itself. Also, U.S. Design Pat. No. 332,441, issued Jan. 12, 1993 to Douglas, discloses an ornamental design comprising lights arranged in a circle on an automobile wheel. This patent does not disclose any means of attachment nor powering.

Also, U.S. Pat. No. 5,876,108, issued to Lu Chien on Mar. 2, 1999 teaches a lighting arrangement comprised of a flexible super thin lighting element disposed on a disc-shaped main body arranged to rotate, and a power source and related circuitry. U.S. Pat. No. 6,386,731, issued May 14, 2002 to Cheng, teaches a disc-shaped light, for placement on a rotating wheel, that is powered by a generator disposed in an apparatus in the center of the rotating wheel. U.S. Pat. No. 6,776,458, issued Aug. 17, 2004 to Wang, teaches a plurality of lighting emitting members that are affixed to a wheel cover specifically designed to receive those lighting emitting members. Each light emitting member comprises a light emitting element that is disposed to emit light outward from a point below a plane of the surface of the wheel cover. This appears to result in light being transmitted outwardly from points of the wheel cover, rather than broadcast across a portion of the surface of the wheel cover.

Also, patents have issued that regard a lighting device for a rotating vehicle wheel that is attached to the valve stem of the tire of the wheel. For example, U.S. Pat. No. 6,467,939 issued Oct. 22, 2002 to Deutsch et al., U.S. Pat. No. 6,742,913 issued Jun. 1, 2004 to Deutsch, and U.S. Pat. No. issued Jun. 3, 2003 to Wen Huang. These patents describe devices that are threaded or otherwise attached to the valve stem, and that have a light source that is spaced apart from the surface of the respective wheel or wheel cover so that the main effect of the lighting would appear to create a circular trail of light from the light source during rotation, rather than a substantially reflective effect upon the surface of the respective wheel or wheel cover.

Other references that refer to various aspects of the technologies utilized in lighting and power sources include U.S. Pat. Nos. 5,624,175, 5,497,302, and 6,789,928. These patents as well as all references, patents, patent applications, patent publications, technical publications, scientific publications, and other references referenced herein are hereby incorporated by reference in this application in order to more fully describe the state of the art to which the present invention pertains, and the basic operational variations of various lighting circuits.

DETAILED DESCRIPTION OF EMBODIMENTS OF THE INVENTION

Despite the advances in the art, there remains a need for a light source that is readily attachable to a wheel that is subject to rapid rotation and consequent forces, such as an automobile wheel, that does not require substantial modification of an existing wheel, and that is readily positionable at any of a number of locations on an existing wheel. As is described herein, embodiments of the present invention satisfy such need, and also provide features as described and claimed below.

More particularly, the inventor of the present invention has identified a problem with existing lighting devices that are applied to generate light while attached to a rotating wheel of an automobile, a bicycle, or other moving vehicle. Namely, existing lighting devices are limited in their placement and their ability to direct a desired beam of light in a direction desired by a particular end user. Having identified this problem, and having recognized the desirability of providing illumination devices that may be applied by end users to create a desired arrangement of such devices on a rotating wheel, so as to create a desired, at times unique, arrangement and lighting pattern, the inventor of the present invention has identified and developed a solution to this problem.

The present invention is directed to illumination devices adapted for adhesion to a rotating wheel. While lights are known in the art that are integral with a wheel, attachable to the wheel through complex and expensive attachment means, or reversibly attachable to the tire inflation valve, such lights are complex to install, expensive and/or limited in their placement and functions. In contrast, embodiments of the present invention may be placed at a variety of locations on a wheel or wheel cover, including along radiating linear parts of the wheel or the wheel cover, so as to provide for a multitude of creative arrangements of the illumination devices and the lighting displays therefrom. Such arrangements may include, for example, illuminating one or more of the radiating members (i.e., spokes) of an automobile wheel, or of analogous features of a wheel cover, or the rim of the wheel, with illumination that is substantially parallel to the surfaces of those members, so as to primarily cast light on those surfaces. It is noted that the illumination devices may be positioned to direct light upon reflective surfaces of a rim of a wheel to provide an aesthetically pleasing effect. Also, it is noted that such effect may be particularly noticeable when the wheel is chrome-plated, or similarly highly reflective.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1A:
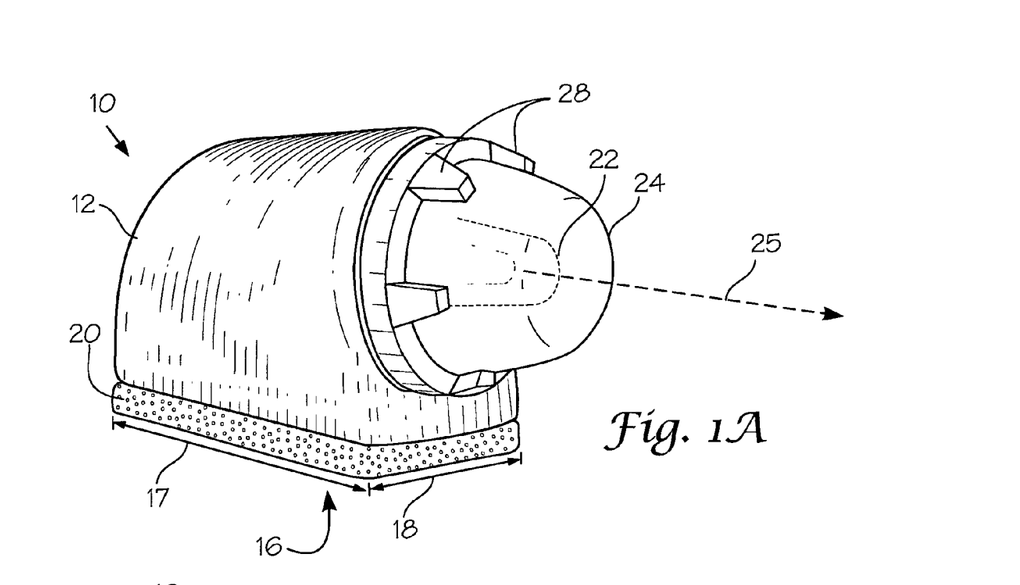
FIG. 1A is a front/side perspective view of an illumination device of the present invention.
Figure 1B:
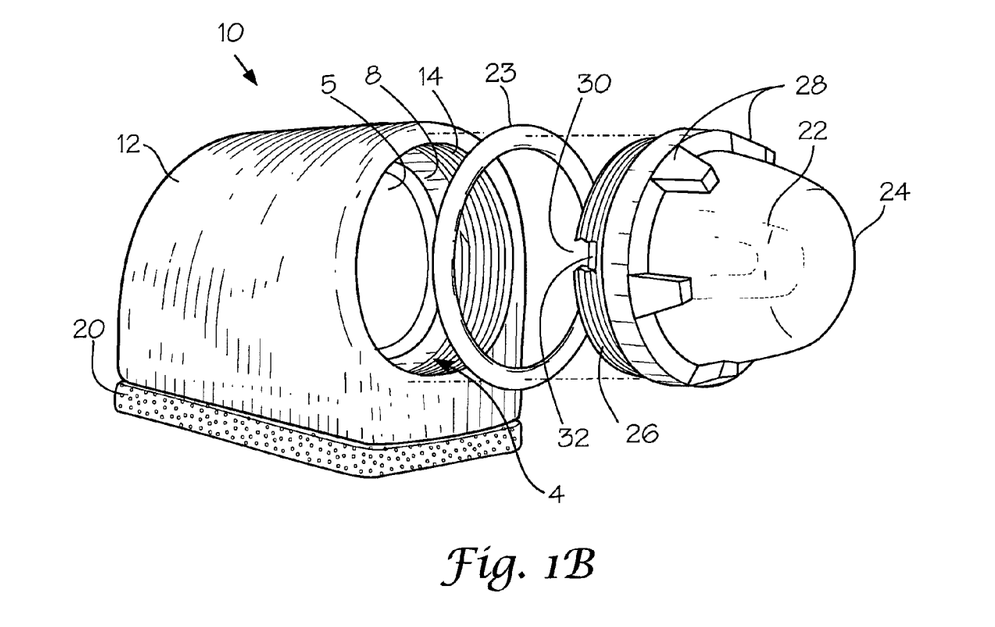
FIG. 1B is a partial exploded view of the illumination device of FIG. 1A.
Figure 1C:
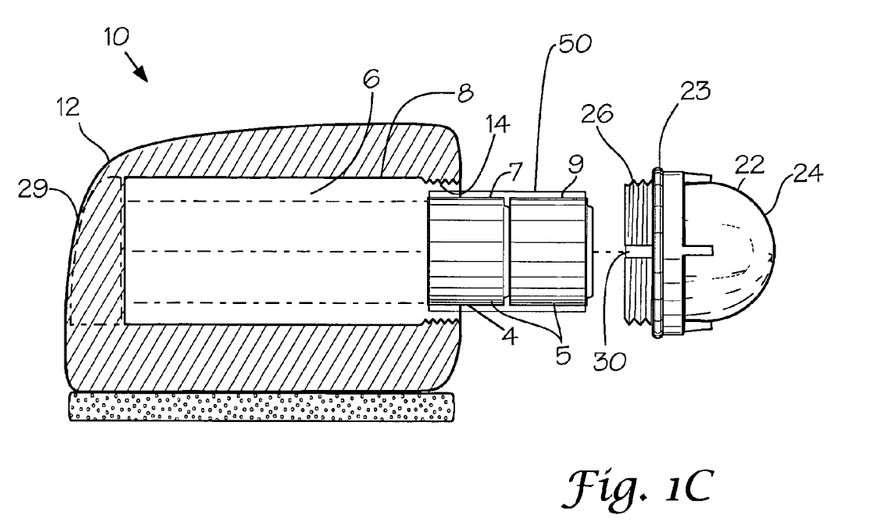
FIG. 1C provides a cross-section view of the illumination device of FIG. 1A.
Figure 1D:
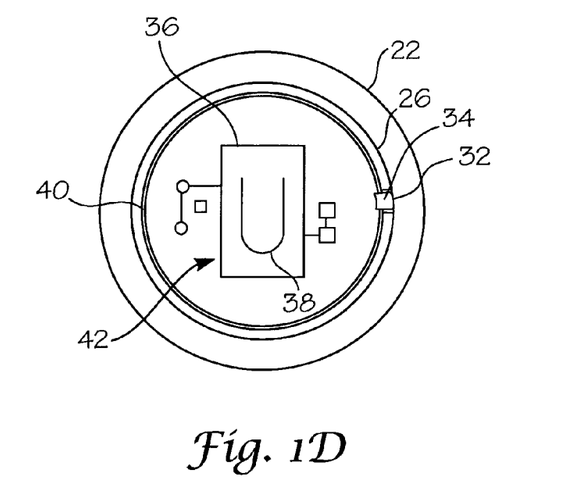
FIG. 1D depicts a back side of the lamp cover of the illumination device of FIG. 1A.

FIGS. 1A–1D exemplify an illumination device 10 of the present invention comprising a rigid body 12 and a lamp cover 22. FIG. 1A is a front side perspective view, and FIG. 1B is a partial exploded view, and FIG. 1C provides a cross-section view of the illumination device 10 of FIG. 1A. FIG. 1D depicts a back side 32 of lamp cover 22.

As viewable in FIG. 1A, rigid body 12 has outer surface 14 that includes a substantially flat side 16 sized to provide a desired amount of surface area so that, when an adhesive material 20 is applied to the flat side 16, the adhesive material 20 has sufficient bonding strength to maintain the illumination device 10 on a desired surface of a wheel or wheel covering. The surface area may be estimated for a rectangular flat side, such as flat side 16, by multiplying the length 17 of flat side 16 by the width 18 of flat side 16.

The lamp cover 22 comprises within it a light source 24, viewable in outline only in FIG. 1A. This light source 24 may be any type of light source known in the art. Common AC/DC light sources include for example, neon lamp, cold cathode fluorescent lamp, electro luminescence (EL), and light emitting diode (LED). The light source 24 depicted in FIGS. 1A–1C is an LED that directs it emitted light in a substantially linear direction from the lamp cover 22 along an axis defined by the line 25, in the direction of the arrow at the end of line 25. It is known that many LEDs have an directionality to the broadcast of light, and this directionality is used advantageously in some embodiments of the present invention, as is discussed below.

As shown in FIG. 1B, the lamp cover 22 also comprises male threads 26 sized to engage mating female threads 14 of the rigid body 12. The lamp cover 22 also comprises tabs 28 spaced apart to aid in manually screwing and unscrewing the lamp cover 22 into and from, respectively, the rigid body 12. As viewable in FIGS. 1A–C, the threads 26 have a break 30 in them, in which an end 32 of a side electrical contact 34 (shown in FIG. 1D) is disposed.

FIGS. 1B and 1C also reveal other components of an electrical circuit that powers and controls the operation of the light source 24 in lamp cover 22. Rigid body 12 comprises an interior space 13. Within inner space 13 of the rigid body 12 is a hollow interior cavity 4 suitable to receive a power source, such as batteries 5 (not all batteries are shown that are required to fill inner space 13 within cavity 4, and to power the device). The interior space 13 that is not occupied by the hollow interior cavity 4 may be filled or hollowed. Cavity 4 has an end wall 6 and a cylindrical side wall 8, the distal ends of which have the female threads 14. When one or more batteries are suitably placed in the cavity 4, whose end wall 6 and side wall 8 are electrically conductive, and when the lamp cover 22 is screwed over the end of the cavity 4, an electrical connection is made from a first battery contact 7 through the electrically conducting rigid body to the end 32 of the side electrical contact 34.

FIGS. 1C and 1D show additional aspects of the electrical circuit. FIG. 1D depicts components on a back side of the lamp cover 22 of the illumination device 10. A central electrical contact 36 comprises an upwardly sprung tab 40 that extends to engage a second battery contact 9 when the lamp cover 22 is screwed over the end of the cavity 4. The central battery contact 36 is disposed above a circuit board 40, which is electrically connected both to the side electrical contact 34 and the central electrical contact 36, and which resides within the threads 26. Also depicted in FIG. 1C is a flexible plastic barrier 50. This is wrapped around the batteries 5 to serve as an insulating barrier between the sides of the batteries 5 and the cylindrical side wall 8.

The circuit board 40 comprises, or, alternatively, is electrically connected to, a main switch 42 (indicated by an arrow pointed to circuit board 40). In the embodiment depicted in FIGS. 1A–1C, the main switch 42 is a motion-activated type switch, closing the electrical circuit upon sensing of a motion of a designated minimum intensity, and only opening the circuit after a set period of time of no such motion. This provides for light emission by the light source 24 during revolution of a wheel (not shown in FIGS. 1A–1C) upon which the illumination device 10 is attached by adhesive material 20.

Also, as shown in FIGS. 1A and 1B, an O-ring sealing member 23 is disposed between engaging surfaces of the rigid body 12 area surrounding the cavity and the lamp cover 22 to provide a water tight seal and thus prevent contamination of the interior space (i.e., the cavity 14 and the circuit board 40 and electrical connections connecting to circuit board 40) by moisture and foreign particles.

Further to the basic arrangement of elements, it is appreciated that embodiments may be fabricated such that the light source is integral with the rigid body. For instance, not to be limiting, referring to FIG. 1C, rather than threading on, the components of lamp cover 22, including the light source 24, may be provided as part of a unified rigid body that has an access portal, for insertion and removal of batteries, at an opposite end of the unified rigid body (such as the region shown as "29" in FIG. 1C). Other arrangements for insertion of batteries, or other arrangements of power sources, may be provided for such illumination devices in which the light source is integral with the rigid body (which is taken to include formed in a unitary body, assembled together (i.e., not removed for battery change-out), and inserted to a designed space in the body).

Figure 2A:
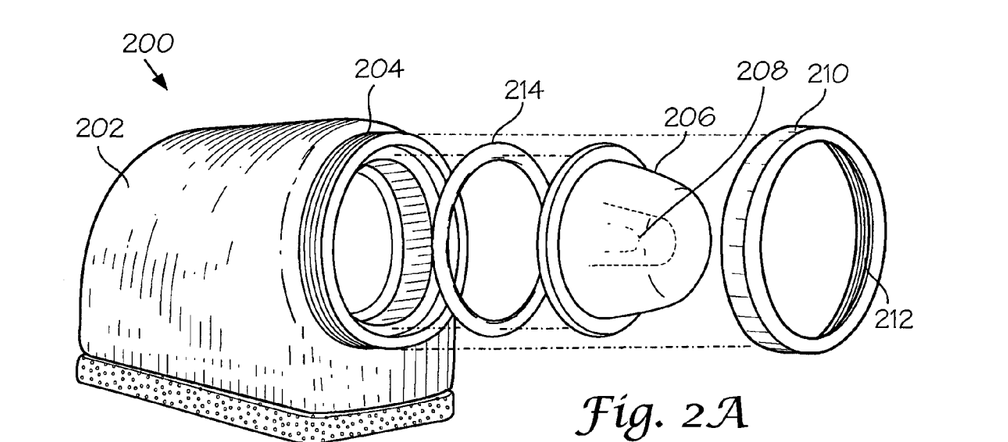
FIG. 2A is a perspective, partial cut-away view of an alternative embodiment of an adhesive illumination device of the present invention.

The above example is not meant to be limiting. For example, in some embodiments, an illumination device of the present invention may have more than one light source, such as two light sources respectively dispersing light in opposite directions along a single axis. Also, other design aspects of closing a cavity, in which a power source is contained, may be employed. For example, not to be limiting, FIG. 2A is a perspective, partial cut-away view of an alternative embodiment of an adhesive illumination device 200 comprising a rigid body 202 and a lamp cover 206 within which is housed a light source 208. For assembly, a closing ring 210 fastens over the lamp cover 206. In this embodiment the closing ring 210 comprises female threads 212 that mate with male threads 204 of rigid body 202. A sealing O-ring member 214 is positioned between the rigid body 202 and the lamp cover 206, and provides a barrier against moisture and dirt when the lamp cover 206 is attached to the rigid body 202 by means of tightening of the closing ring 210. Although not depicted and discussed for FIG. 2A, the illumination device 200 comprises functional components such as described for the embodiment of FIGS. 1A–1D.

Figure 2B:
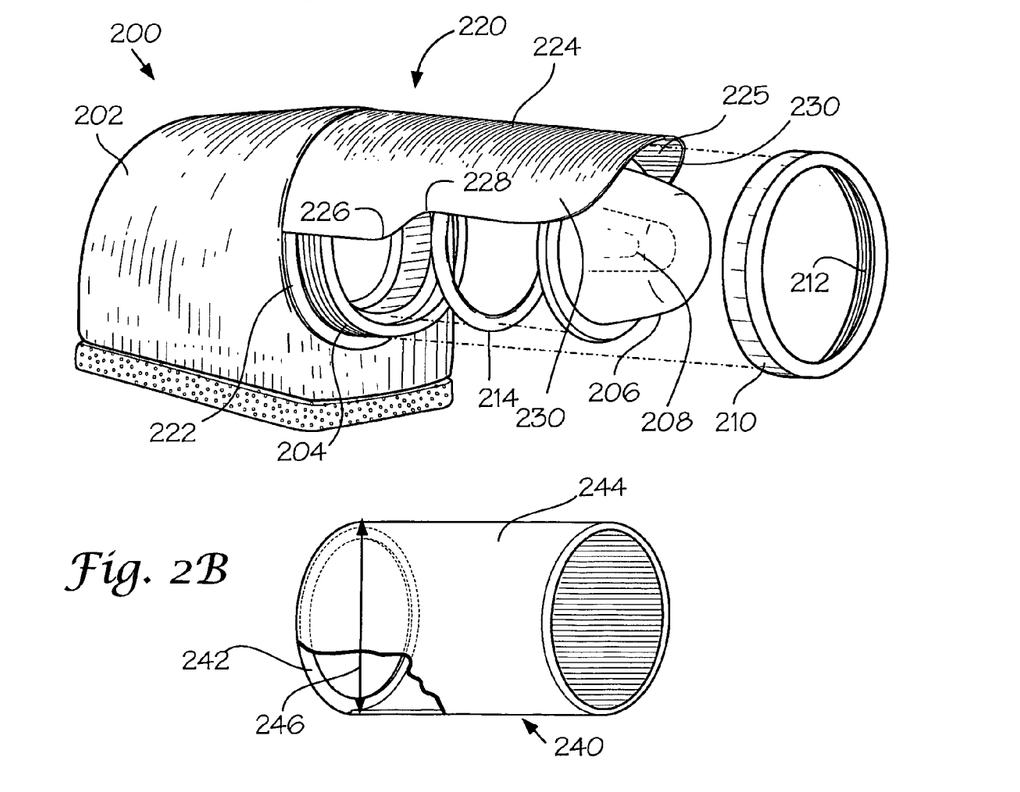
FIG. 2B provides a view of the alternative embodiment of FIG. 2A, additionally depicted examples of light-directing shields that may be utilized with this embodiment.
Figure 2C:
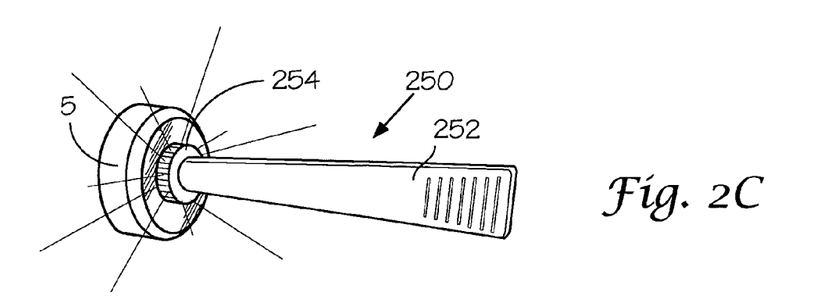
FIG. 2C depicts an example of a battery recovery tool.

FIGS. 2B and 2C depict additional components of the illumination device 200 and for a kit that comprises any illumination device of the present invention. In some embodiments, it may be desirable to shield light from spreading in one or more directions, and/or providing a reflective surface to direct light from the light source 208 to one or more other directions or objects. To achieve such ends, a partial light shield 220, comprising a flattened washer portion 222 and a light cover 224 having an inside surface 225, and two side inflections 226 and 228 on each of two sides 230 may be inserted during assembly by placing the flattened washer portion 222 around the male threads 204 of the rigid body 202, maintaining the partial light shield in a desired position by holding the sides 230, and tightening the closing ring 210 over the male threads 204, thereby tightening the partial light shield 220 in the desired position. The inside surface 225 of the partial light shield 220 may have varying degrees of reflectiveness, or may have light-absorbing properties. It also may be translucent, and/or of a desired color.

Also depicted in FIG. 2B is a surrounding light shield 240, suitable for installation instead of the illustrated installation of partial light shield 220. Surrounding light shield 240 comprises a flattened washer portion 242 and a cylindrical body 244 having an inside surface 245 and an inside diameter 246. The surrounding light shield 240 may be sized so that its inside diameter 246 near the flattened washer portion 242 closely fits over the outside diameter of the closing ring 210, so that assembly may be effectuated by sliding the closing ring 210 into the surrounding light shield 240, and then holding these together while tightening the closing ring 210 over the male threads 204 of the rigid body 202. The surrounding light shield thereby provides a surrounding barrier of light passage from the light source 208. It is noted that although the surrounding light shield is depicted to have a uniform cylindrical body 244, this is not meant to be limiting. The shape may be varied so that the body expands outwardly from the flattened washer portion 242, and it may take on a shape other than cylindrical. Also, the inside surface 245 of the surrounding light shield 240 may have varying degrees of reflectiveness, or may have light-absorbing properties. It also may be translucent, and/or of a desired color.

Both types of light shields 220 and 240, when positioned between the light source and a side away from the wheel or wheel covering to which an illumination device is attached, are effective to block light from a viewer disposed lateral to the wheel or wheel cover (i.e., a viewer facing the wheel or wheel cover from a side of the vehicle). This effectively reduces or eliminates a tracer effect during rotation of the wheel, in that the light directly emitted from the light source is blocked from a viewer who is positioned lateral to the vehicle bearing the wheel or wheel cover (i.e., who is looking at the wheel or wheel cover from the side of the vehicle).

FIG. 2C depicts an example, not meant to be limiting, of a battery removal tool 250 to remove batteries from an illumination device of the present invention. The tool 250 comprises a handle 252 and a base 254 that is magnetized or that comprises a magnet. When an illumination device of the present invention needs batteries replaced, once the batteries are exposed, the base 254 may be brought close to or in contact with the most outwardly exposed battery, and by moving the handle away the battery may be removed from the illumination device. This is done sequentially to remove all batteries. Similarly, the battery removal tool 250 may be used to position and insert new or recharged batteries into the illumination device.

Figure 2D:
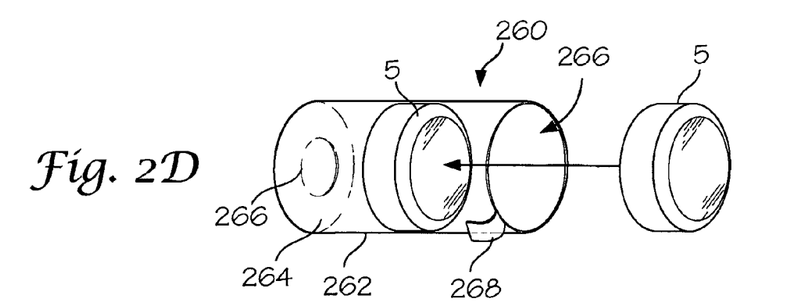
FIG. 2D depicts one embodiment of a battery holding sheath used as part of some illumination devices of the present invention.

FIG. 2D also provides an example, not meant to be limiting, of a battery holder sheath 260. Battery holder sheath 260 comprises a thin cylindrical shell 262 having a closed end 264, at the center of which is an opening 266 adapted to allow passage of electrical current, and an open end 266 through which batteries may pass. Battery holder sheath 260 slidably fits into a cavity of a rigid body of an illumination device and is sized to hold the batteries required for such device. The batteries may be placed into the sheath 260, and then the sheath 260 is slid into the cavity, or the sheath 260 may be first slid into the cavity, and then the batteries added. One battery 5 is depicted entering the sheath 260. In embodiments in which a sheath 260 is used, the bottom of the cavity is adapted to provide a contact for current from the battery through the opening. As shown in FIG. 2C, battery holder sheath 260 may also comprise a flexible tab 268 that allows for grabbing by hand to remove the battery holder 260 from the cavity, such as when the illumination device is attached to a wheel or wheel cover and the batteries need to be replaced or recharged. Thus, in embodiments of an illumination device of the present invention, a battery holder sheath such as 260 may be employed to surround the batteries as the batteries occupy the cavity. Such battery holder 260 thereby allows for easy removal of batteries while the illumination device is attached to a wheel or wheel cover, regardless of the angular orientation of the device. It is appreciated that a battery holder sheath may be designed to be integral with another removable component of an illumination device.

Further regarding a main switch (such as the main switch 42 in the embodiment of FIGS. 1A–1D), in various embodiments a main switch may be located within a lamp cover (such as lamp cover 22), attached or connected directly to one of the batteries, or in another suitable location (such as within an interior space of a rigid body other than a cavity holding the batteries). Generally, such main switch no matter where it is positioned is electrically connected between the power source (i.e., the battery or batteries) and the respective light source(s), so that in an 'on' mode the electrical circuit is complete and the light source 24 produces light, and in an 'off' mode the light source 24 does not emit light. As noted, in some embodiments the main switch may be a motion-activated type of switch. It is known in the art that there are a variety of mechanisms for a motion-activated switch, and any of these known mechanisms, or later-developed mechanisms, may be utilized in a motion-activated switch for embodiments of the present invention. Not to be limiting, a motion-activated switch may utilize a mechanism selected from the group consisting of: an accelerometer, a micromachined accelerometer, a mercury switch, a moving ball bearing as the contact switch, and a gravity-activated trip wire.

As one example of a main switch, at least two electrical contacts, spaced apart, are provided. A moving member (such as a ball bearing) is disposable between a first position not in contact with at least two of the electrical contacts and a second position in contact with at least two of the electrical contacts depending on motion imparted to the rigid body. Thus, due to the moving ball bearing, the motion of the illumination device causes the at least one light source to switch on and off. This example is not meant to be limiting, as it is well known in the art that micro-tooled accelerometers, and other switches employing printed circuits, provide economical and reliable switches, including motion-activated types of switches.

In some embodiments the electrical circuit additionally comprises a control circuit having flashing mechanism (or means) (such as a timing circuit) for producing a periodic voltage pulse effective to cause a respective light source to flash alternatingly on and off. The control circuit may further comprise timing mechanism (or means) for controlling the duration of the flashing on-off cycles, each cyclic flashing episode being initiated by a motion detection switch that closes the circuit so that the flashing means may initiate its sequence. The timing circuit (or means) may be set to have the flashing episode continue only for a specified period following a first motion (thus stopping the flashing after that period even if the motion continues unabated), or may be set to have the flashing episode continue for a predetermined length of time after detecting a cessation of motion.

In some embodiments, the switching, and, optionally, the pattern of light emission, may be operated remotely. For example, radio control may be effectuated by any means known to those skilled in that art, including the by the teachings of the following patents incorporated by reference for such teachings: U.S. Pat. Nos. 3,936,833; 4,027,249; 4,135,144; 4,360,808; 4,400,698; 4,406,085; 4,607,312; 4,697,179; 5,334,076; 6,659,837; and 6,661,351. These references provide examples, not meant to be limiting, of the components and operation of remote control systems that may be utilized in some embodiments of the present invention. Further for example, components of the radio control (including reception devices and the like) may be located within and/or connected to the circuit board 40 of the device of FIG. 1 (see FIG. 1D). Alternatively, or in addition to this, one or more such components of the remote control (which need not be limited to radio control) may be located in the body of the illumination device, for example, in the region identified as 29 in FIG. 1C.

Figure 3:
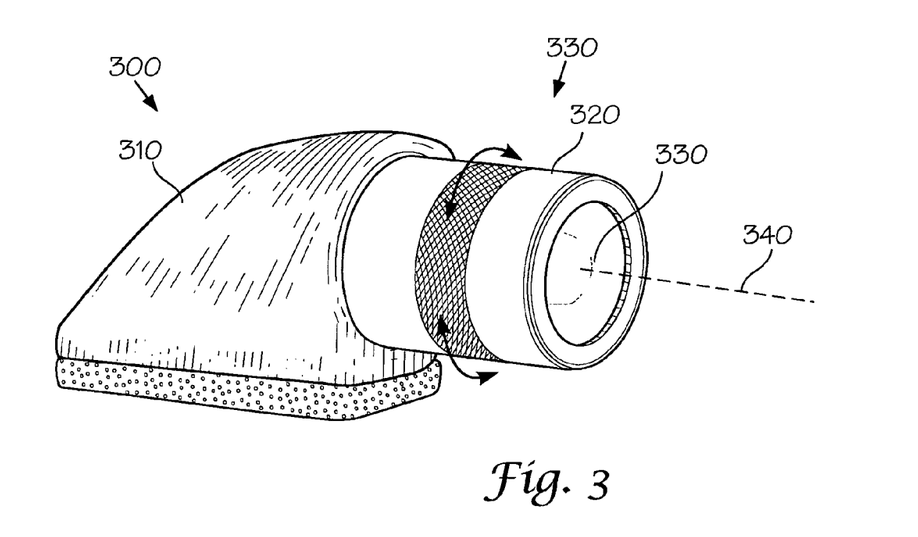
FIG. 3 provides a side perspective view of another example of an illumination device of the present invention.

Alternatively, in some embodiments a flashing mechanism (or means) may be in an illumination device which has a main switch that is closed manually (or by radio control remote signaling). FIG. 3 provides a side perspective view of an example of an illumination device 300 that utilizes a simple manually operated main switch that closes an electrical circuit that includes a flashing mechanism. Illumination device 300 comprises a rigid body 310 and a rotating lamp cover 320 (rotation indicated by arrows). A clockwise rotation of the lamp cover 320 (clockwise when viewed from the end emitting light) closes the electrical circuit (not shown, but see description of FIGS. 1A–1D for general example of electrical circuit components). Thereafter, a flashing control circuit, which is part of the electrical circuit (e.g., affixed to or integral with a circuit board component of the electrical circuit), causes an alternating on and off flashing of the light source 330. This flashing output continues until the rotating lamp cover 320 is rotated counter-clockwise to open the main switch. It is noted that the light source 330 is housed within a cylinder 335 that shields light transmission laterally, so as to result in a more directed beam of light whose major axis of travel is along axis 340.

Figure 4A:
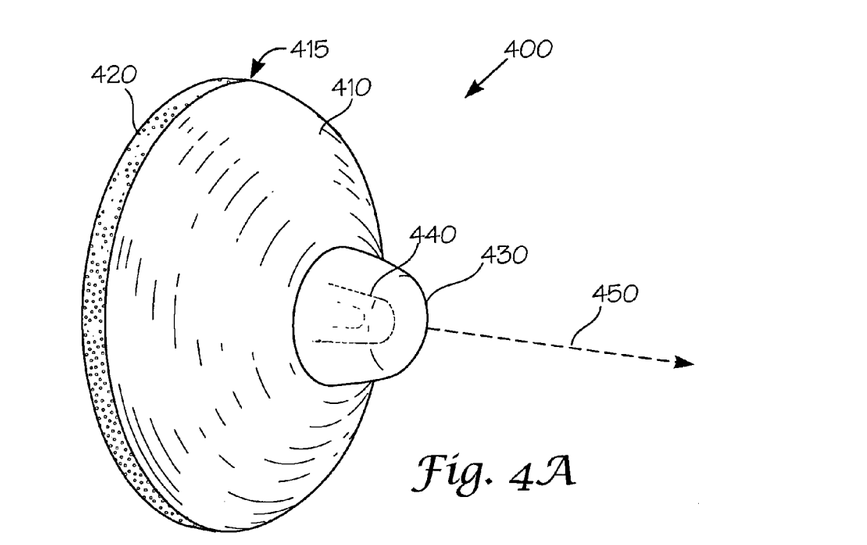
FIG. 4A provides a perspective view of another example of an illumination device of the present invention.
Figure 4B:
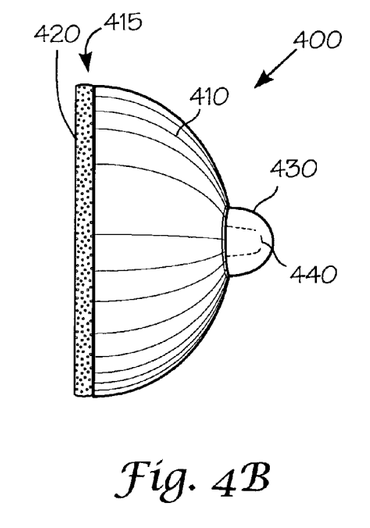
FIG. 4B provides a side view of the illumination device of FIG. 4A.
Figure 4C:
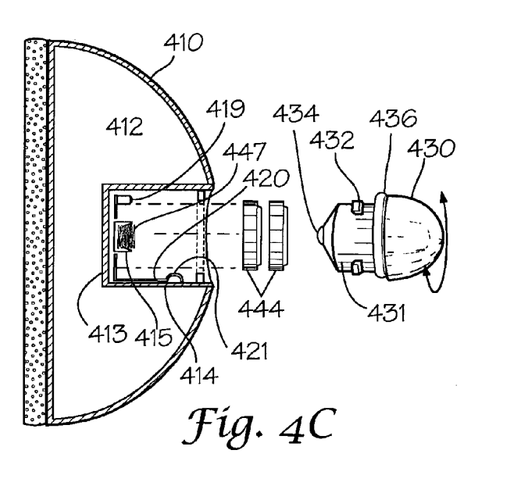
FIG. 4C provides a side cross-section view of the illumination device of FIG. 4A.

FIGS. 4A–4C provide, respectively, perspective, side, and side cross-section views of another embodiment of the present invention. As viewable in FIGS. 4A and 4B, a partial spherically shaped illumination device 400 is comprised of a rigid body 410 having along a flat surface 415 an adhesive layer 420 attached thereto, and adapted to adhere to a portion of a wheel or wheel cover. A transparent or translucent light dome 430 encloses a light source 440. The light source 440 may be selected to provide illumination that is directed in a vector, such as outward from the illumination device 400 along an axis 450, or it may be selected to provide a broad dispersal of light to provide a different desired effect.

FIG. 4C depicts that a cylindrical cavity 412 in the rigid body 410 comprises a an end wall 413 and a cylindrical side wall 414, the side wall having a slot (indicated by wall thickness differences). A retaining structure 415 is centrally positioned in the end wall 413 to hold in place a spring 417. A metallic conductor 418 is positioned in the cavity 412 to provide electrical connection from a bottom pole (not shown) of a battery placed in the cavity 412. Briefly, a rising contact 419 contacts the bottom pole (which extends across most of the battery) as the battery compresses the spring 417. A leg 420 of the metallic conductor 418 occupies the slot in the side wall 414, and at its distal end is a curve 421 that contacts a conductive side 431 of a light dome 430. The cylindrical side wall 414 also comprises a locking ring 422 that has breaks (not shown) sized to allow entry of locking cleats 432 on the light dome 430.

The light dome 430 also comprises, in addition to the conductive side 431, a second electrical contact 434 disposed at an inward distal end so as to contact a top pole (not shown) of a stack of batteries 444 that fit into cavity 412. An O-ring member 436 is positioned around the light dome 430. The light dome 430 also comprises a light source 440 disposed within it, and elements of an electrical circuit such as are needed to complete an electrical circuit between the batteries 444 and the light source 440. An electrical circuit is formed, which includes a main switch (not shown, but see description of FIGS. 1A–1D for general example of electrical circuit components and descriptions of various switches), when the light dome 430 is fastened by the locking cleats 432 onto the locking ring 422, which presses the batteries 444 against rising contact 419, also compresses spring 417, as also results in the second electrical contact 434 making contact with the top pole (not shown) of the topmost battery 444 of the stack of batteries 444. The O-ring member 436 is retained at the top perimeter of the cavity 412 as depicted to provide a seal against moisture and dirt. The switch may be of any type discussed herein, or known to those skilled in the art, may be located within the light dome 430, and typically, in such embodiment, is a motion-activated switch.

The embodiment depicted in FIGS. 4A–4C provides one of many design and circuitry approaches that may be used to practice the present invention. As noted, any number of electrical circuits, and of switches, as are known in the art may be utilized for this or for other designs of illumination devices of the present invention.

Figure 5A:
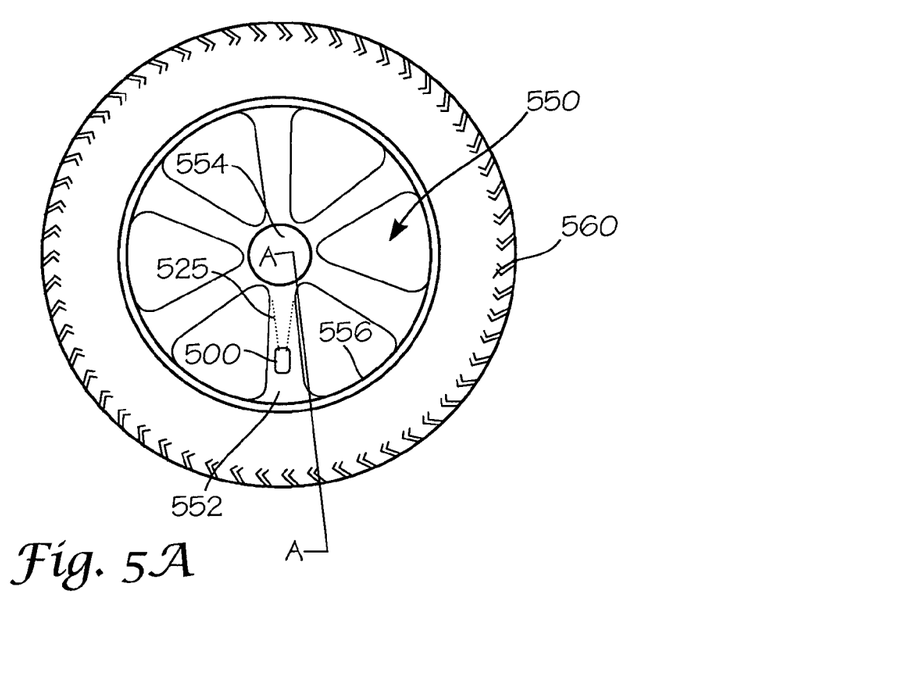
FIG. 5A depicts an illumination device of the present invention attached to a wheel.

As viewable in FIGS. 5A–E, one desirable use of certain embodiments of the present invention pertains to their functionality in being placed in close proximity to and in substantially parallel alignment with a portion of a wheel or wheel cover to illuminate that portion to provide an attractive pattern of lighting. For example, not to be limiting, FIG. 5A depicts an illumination device 500 of the present invention that is adhered by an adhesive material layer 502 to a wheel 550 along one spoke 552 that travels radially from the wheel hub 554 to the wheel rim 556, which engages tire 560. Illumination device 550 comprises a light source 504 that emits a predominant light beam 525 (see also FIG. 5B, in which beam 525 is delineated from a side perspective). The predominant light beam 525 emitted by the light source 504 may be formed by a combination of lenses (not shown), using as the light source 504 an LED having a directional beam that directs most of its light in one direction along a single axis, or other approaches as known in the art, so that the predominant light beam 525 has a predetermined spread of a predominant percentage of light emitted over a given distance.

Figure 5B:
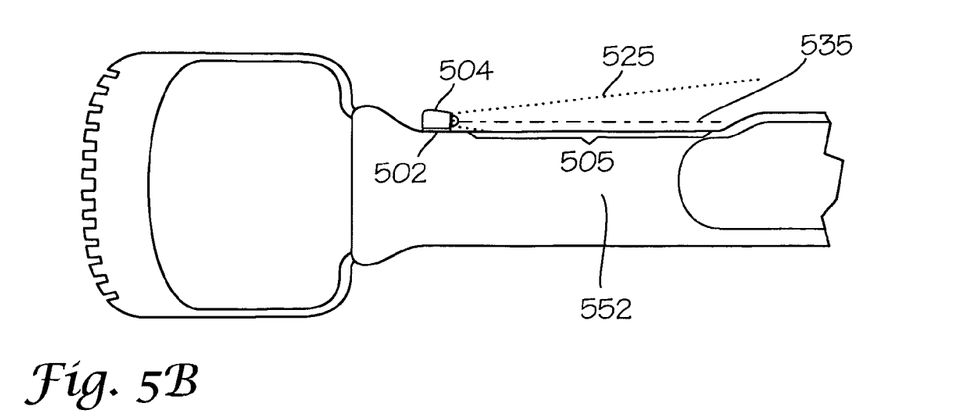
FIG. 5B depicts a cross section side view of the illumination device of FIG. 5A, as attached to the wheel.

By providing a predominant light beam in proximity to a wheel or wheel cover surface, such as spoke 552, illumination device 500 is effective to illuminate so as to provide light that reflects along and illuminates a portion 505 of the spoke 552. This is depicted in FIG. 5B, a cross section side view of the illumination device 500 adhered along spoke 552 taken along plane A—A of FIG. 5A. As so depicted, illumination device 500 comprises light source 504 that emits light as light beam 525, principally along an axis 535 that is spaced from and substantially parallel to a plane that includes the adhesive material layer 502. Since adhesive material layer 502 is adhered to the spoke 552, the light beam 552 is effective to illuminate the portion 505 of the spoke 552 of wheel 550 that is adjacent to the attached illumination device 500. In some embodiments, and depending on the level of battery charge and other factors, some light may also reach and illuminate the hub sufficiently to have a noticeable effect to an average viewer while the wheel is in motion, such as on a moving vehicle.

Figure 5C:
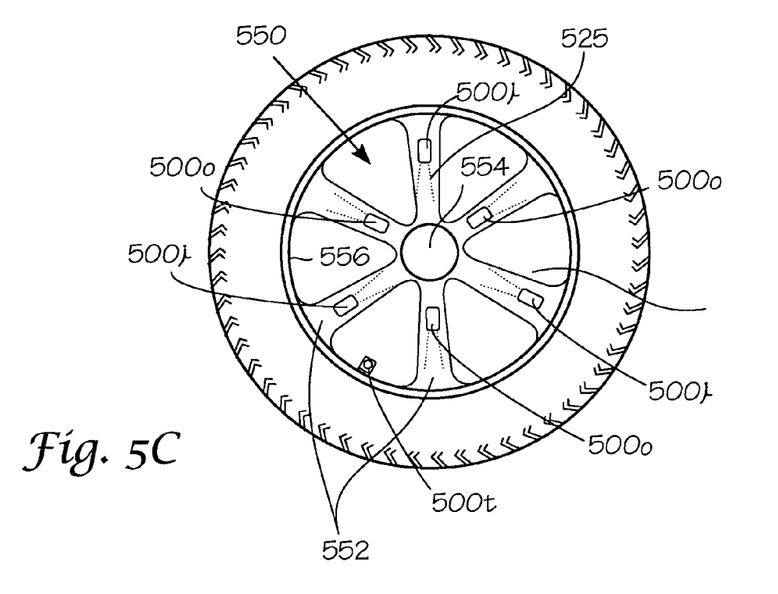
FIG. 5C depicts an automobile wheel having six spokes, a central hub and a rim, having attached to each spoke an illumination device of the present invention.

FIG. 5C depicts an automobile wheel 550 having six spokes 552, a central hub 554 and a rim 556, each spoke 552 having attached to it an illumination device 500 of the present invention. Without being limiting of the range of various lighting designs possible using a plurality of illumination devices of the present invention, such as 500, the arrangement in FIG. 5C is comprised of three illumination devices 500*i* positioned about one third of the length of a respective spoke 552 from the outer end of the respective spoke 552 (i.e., where the spoke 552 meets the rim 556), and directing its respective predominant light beam toward the hub 554. Positioned about two-thirds of the length of a respective spoke 552 from the outer end of the respective spoke 552 (i.e., closer to the hub 554 than the rim 556), and on respective spokes 552 that are between each of the spokes 552 having an illumination device designated 500*i*, are three illumination devices designated 500*o* that are positioned to direct their respective predominant light beams 525 outwardly. This arrangement of illumination devices 500*i* and 500*o* provides a creative pattern of light on the various surfaces of the wheel 550, including casting light from the 500*o* devices upon portions of the rim 556.

It is also noted that one or more illumination devices of the present invention may be positioned directed to a rim (such as 556) so that the primary illumination is upon portions of such rim. This may be aesthetically pleasing when such rim is highly reflective, such as when the rim is chrome-plated.

FIG. 5C also shows one illumination device, 500*t*, that is positioned along an inside face of the wheel rim 556 with the light directed straight outward from the wheel 550. This demonstrates the universal nature of the invention, in that a wide range of lighting patterns and choices are available when attachment is provided by the adhesive material layer (not specifically shown in FIG. 5C, see other figures) on one surface of the device 500*t*.

Figure 5D:
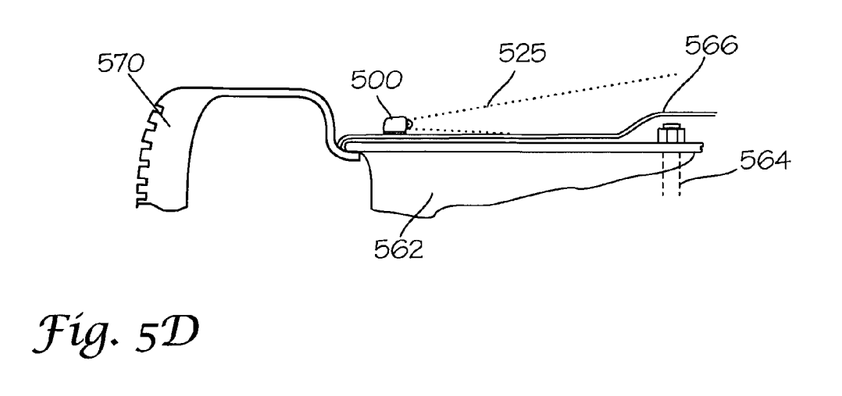
FIG. 5D provides a partial cut-away cross sectional view of components of an automobile wheel assembly, depicting an illumination device of the present invention attached to a wheel cover of the wheel assembly.

FIG. 5D provides a partial cut-away cross sectional view of components of an automobile wheel assembly 560. This is comprised of a standard wheel 562, through which is shown one lug bolt 564 (of a plurality, usually 5 or 6 for attaching the wheel 562 to the axel), a wheel cover 566, and a tire 570. Positioned on an outside surface 568 of wheel cover 566 is an illumination device 500 of the present invention, directing its predominant light beam 525 inwardly. This example demonstrates that the present invention may be attached to wheel covers (such as plastic wheel covers used on many automobiles) as well as onto metallic wheels. Any arrangement of illumination devices of the present invention may be made on such wheel covers.

Thus, it is apparent that the features of the present invention provide opportunities to place illumination devices on rotating wheels in various positions to achieve a range of lighting effects that is limited only by the creativity and imagination of the end-users of the invention.

Thus, it is appreciated that a method of the present invention, for forming a lighting pattern on a wheel, may be described as follows:

1. attaching by adhesion, to a selected position on the wheel, an illumination device comprising: a rigid body having a substantially flat surface over which is an adhesive layer suitable for said adhesion; a light source; a power source; a switch adapted for motion-activation; and circuitry to connect the light source, the switch and the power source; and
2. activating said switch, to turn on said light source;

wherein from said selected position light from said light source illuminates a portion of said wheel, thereby forming the lighting pattern.

It is appreciated that when the switch is of the motion-activated type of switch, the activating step is achieved by rotating the wheel.

It is appreciated that the adhesive material used on a substantially flat surface of a rigid body of the present invention must have sufficient strength, durability and ability to withstand relatively elevated temperature to hold the respective illumination device on a surface of a wheel or wheel cover that rotates at relatively high speeds for extended periods over a range of climatic and moisture conditions. With regard to the an ability of an adhesive layer or material to withstand, while retaining adhesive properties, elevated temperature, the inventor identified this as a problem for adhesively adhering illumination devices, in that automotive, truck and other vehicle wheels that have braking devices associated with them often experience elevated temperatures. This presents a problem because many standard adhesives would not tolerate such elevated temperatures, and, accordingly, would fail over a particular, relatively short period of time. Having recognized this as a problem, and as a limitation to developing successful embodiments of illumination devices that adhere to wheels and wheel covers, the inventor sought and identified certain types of adhesive products that are not in the present art field, but that nonetheless would overcome this problem, and thereby allow the development of illumination devices that would comprise adhesive layers effective to withstand operational temperatures of automobile and truck wheels and wheel covers.

For example, in various embodiments of the present invention, an architectural-grade adhesive tape is used as the adhesive material. One source of such architectural-grade adhesive tape is 3M® VHB®. For example, two 3M® VHB® general purpose tapes are identified by product numbers 4955 (having a 0.080 inches thickness) and 4959 (having a 0.120 inches thickness. Such tape has two adhesive sides, each initially covered by a peelable thin protective removable covering (also referred to as a "liner"). A piece of such tape is cut to a desired size suitable to cover a flat surface of a rigid body of a lighting device of the present invention, a layer of peelable thin protective removable covering is removed from one side of the piece, exposing a first adhesive side, which is contacted to the flat surface. Then, just prior to attachment of the rigid body to a desired portion of a surface of a wheel or wheel covering, the opposite layer, covering the opposite side of adhesive material, is removed to expose this adhesive side, which then is contacted to the desired portion of said wheel or wheel covering surface.

Also, it is noted that by use of the term "substantially flat surface" is meant to indicate that a so-indicated surface of an illumination device of the present invention may be planar entirely across its adhering surface, or alternatively, may have a deviation from planar, measured between one edge, an opposing edge, and an intermediate line or point of inflection or curvature between the two edges, that does not exceed about 15 degrees. In typical embodiments of the present invention the surface is flat, without visually observable deviation from planar. However, for some applications, a curvature or other deviation, such as a folding to form two sides of the surface angled with respect to one another, from planar, may be desirable to accommodate adhesion to a surface that is not flat. Also, it is appreciated that the thickness of the adhesive material that forms an adhesive layer of an illumination device of the present invention has a role in accommodating the attachment of the illumination device to surface that has a curvature, or other inflection, that comprises a deviation from a flat surface.

As to the manufacture of the rigid bodies of the present invention, such rigid bodies may be made from aluminum or aluminum alloy material that first is molded to a desired shape, and then is machined, such as to add threads and/or additional contours. An additional step may be to apply a chrome finish to the body, by any of various methods known to those skilled in the art.

Alternatively, such rigid bodies may be comprised of two half shells that are adhered together after fabrication. For instance, the two half shells can be easily fabricated using an injection mold process. The half shells of a particular rigid body may also be fabricated by other processes, such as vacuum forming, stamping, and the like. A rigid body may be constructed from a suitable plastic material, such as polystyrene, polycarbonate, acrylic, and the like. Manufacture of lamp covers of the present invention may be similarly constructed, using, however, transparent or translucent materials having acceptable optical properties, and optionally, depending on design criteria of a particular embodiment, also including optical lens features that provide for a desired focusing or spreading of the light produced by a light source within the lamp cover. Also, it is appreciated that embodiments of the present invention may utilize a single component that provides the basic functions of the lamp cover and the light source.

It should be understood that the examples and embodiments described herein are for illustrative purposes only and that various modifications or changes in light thereof will be suggested to persons skilled in the art and are to be included within the spirit and purview of this application and the scope of the appended claims.

Use of reflectors to the appropriate sides of the light source, as is known in the art, to increase the effectiveness of the lighting provided by the light source.

In some embodiments of the present invention the power source comprises a battery. This battery may be single-use (i.e., non-rechargeable) or rechargeable.

Further as to removal of the batteries and battery types, kits of the present invention may include the following combinations:

1. A kit comprising an illumination device, such as described and claimed herein, a number of batteries, and a magnetized battery removal tool. The batteries may be non-rechargeable or rechargeable.
2. A kit comprising an illumination device, such as described and claimed herein, a number of rechargeable batteries, a magnetized battery removal tool, and a battery charger device. The battery charger device may be operated from a 12-volt source, so it is adaptable to be operated in an automobile or truck cab, such as from the cigarette lighter.
3. A kit comprising an illumination device, such as described and claimed herein, a number of rechargeable batteries, and a battery charger device. Embodiments of this kit may include illumination devices that comprise a battery holder that is readily removable from the rigid body. The battery charger device may be operated from a 12-volt source, so it is adaptable to be operated in an automobile or truck cab, such as from the cigarette lighter.

Such kits may also include instructions for attachment and change-out of batteries once the illumination device is attached to a wheel or wheel cover.

Also, it is appreciated that the power source may include solar panel or other solar-powered component.

It should be understood that the examples and embodiments described herein are for illustrative purposes only. Thus, while some specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An illumination device for adhesion to a desired location of a rotatable vehicle wheel or wheel covering, comprising:
   a. a rigid body sized for adhesive attachment to a desired location on a rotatable vehicle wheel or wheel covering, the rigid body of a size substantially smaller than the wheel or wheel covering and comprising a cavity adapted to hold one or more batteries, and a substantially flat surface for receiving an adhesive layer suitable for said adhesion to the desired location;
   b. the adhesive layer, positioned on the substantially flat surface;
   c. a light source affixed to said rigid body; and
   d. a switch, located in the rigid body or in a lamp cover affixed thereto, and along an electrical circuit connecting said one or more batteries to said light source.

2. The illumination device of claim 1, wherein said illumination device, after adhesion to the desired location of said wheel or wheel covering, is effective to illuminate, by a predominant light beam, a desired surface of said wheel or wheel covering when said switch provides a current to said light source from the one or more batteries held in the cavity.

3. The illumination device of claim 1, wherein the switch is a motion-activated type switch.

4. The illumination device of claim 1, the light source adapted to provide a predominant light beam in proximity to the wheel or wheel cover.

5. The illumination device of claim 1, additionally comprising a partial light shield effective to block light from a viewer disposed lateral to the wheel or wheel cover.

6. The illumination device of claim 1, additionally comprising a partial light shield comprising a flattened washer portion and a light cover having two side curvilinear inflections on each of two sides.

7. The illumination device of claim 1, additionally comprising a surrounding light shield effective to block light from a viewer disposed lateral to the wheel or wheel cover.

8. The illumination device of claim 1, additionally comprising a surrounding light shield comprising a flattened washer portion and a cylindrical body, the flattened washer portion adapted to fit against the rigid body and the cylindrical body adapted to provide a surrounding barrier of light passage from the light source.

9. The illumination device of claim 1, additionally comprising a battery holder sheath sized to slide into the cavity and surround the one or more batteries.

10. The illumination device of claim 9, wherein the battery holder sheath is comprised of a cylindrical shell having a closed end at the center of which is an opening adapted to allow passage of electrical current, an open end through which batteries may pass, and a flexible tab disposed near the open end, effective to allow removal of the one or more batteries from the cavity.

11. A method to direct light along a desired surface of a wheel or wheel cover of a moving vehicle, comprising:
   a. determining a first desired light source location and a corresponding first desired light direction for a first attachable illumination device; and
   b. affixing the first attachable illumination device at the first desired light source location,
the first attachable illumination device comprising a light source affixed to a rigid body, the rigid body sized for adhesive attachment to the first desired light source location of a rotatable vehicle wheel or wheel covering, the rigid body of a size substantially smaller than the wheel or wheel covering and comprising a cavity for holding at least one battery, and an electronic circuit comprising a switch, the switch, located in the rigid body or in a lamp cover affixed thereto, and the rigid body comprising a substantially flat surface upon which is provided an adhesive surface, wherein the adhesive surface is effective to maintain the first attachable illumination device during operation of the moving vehicle.

12. The method of claim 11, additionally comprising attaching a light shield effective to eliminate a tracer effect during rotation of the wheel.

13. The method of claim 11, additionally comprising repeating steps a and b for one or more additional attachable illumination devices, thereby forming a lighting pattern on the wheel or wheel cover.

14. A method for illuminating a wheel or wheel cover of a moving vehicle, comprising attaching at least one illumination device of claim 1 to the wheel or wheel cover.

15. A kit comprising components of the illumination device of claim 1 and a plurality of batteries of a size to fit the illumination device.

16. The kit of claim 15, additionally comprising a magnetized battery removal tool comprising a handle affixed to a magnetized base.

17. A kit comprising an illumination device of claim 1, a plurality of rechargeable batteries of a size to fit the illumination device, and a battery charger adapted for using as a motor vehicle electrical system as a power source.

18. The kit of claim 17, additionally comprising a magnetized battery removal tool comprising a handle affixed to a magnetized base.

19. A method of forming a lighting pattern on a wheel, comprising:
   a. attaching by adhesion, to a selected position on a rotatable vehicle wheel, a motion-activated light comprising: a rigid body sized for adhesive attachment to a desired location substantially smaller than the wheel, the rigid body having a substantially flat surface over which is an adhesive layer suitable for said adhesion; a light source affixed to the rigid body; a power source within the rigid body; a switch adapted for motion-activation and also located in the rigid body or in a lamp cover affixed thereto; and circuitry to connect the light source, the switch and the power source; and
   b. rotating said wheel to activate said switch, to turn on said light source; wherein from said selected position light from said light source illuminates a portion of said wheel, thereby forming the lighting pattern.

20. A lighting module for attachment to a surface of a vehicle wheel comprising:
   a. a body comprising a cavity for receiving a battery, and comprising an external surface having an adhesive layer;
   b. a light source affixable to or integral with said body; and
   c. an electrical circuit, having a switch located in the body or in a lamp cover affixed thereto, connecting said battery to said light source,
wherein the body is sized for attachment to a wheel surface location substantially smaller than a vehicle wheel to which it is to be attached, and when said adhesive layer is contacted with said wheel surface location, and when said switch provides a current to said light source, the light source illuminates a portion of the wheel.

* * * * *